United States Patent
Yoon (10) Patent No.: US 12,255,503 B2
(45) Date of Patent: Mar. 18, 2025

(54) MOTOR SYSTEM

(71) Applicants: Hyundai Motor Company, Seoul (KR); Kia Corporation, Seoul (KR)

(72) Inventor: Jae Hoon Yoon, Gwacheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 291 days.

(21) Appl. No.: 17/825,838

(22) Filed: May 26, 2022

(65) Prior Publication Data

US 2022/0407396 A1     Dec. 22, 2022

(30) Foreign Application Priority Data

Jun. 18, 2021   (KR) .................. 10-2021-0079275

(51) Int. Cl.
| | |
|---|---|
| *H02K 11/33* | (2016.01) |
| *H02K 11/25* | (2016.01) |
| *H02P 6/08* | (2016.01) |
| *H02P 6/16* | (2016.01) |
| *H02P 27/06* | (2006.01) |

(52) U.S. Cl.
CPC ............ *H02K 11/33* (2016.01); *H02K 11/25* (2016.01); *H02P 6/16* (2013.01); *H02P 27/06* (2013.01); *H02P 6/08* (2013.01)

(58) Field of Classification Search
CPC ...... H02K 11/215; H02K 11/25; H02K 11/33; H02P 6/08; H02P 6/16; H02P 27/06
See application file for complete search history.

(56) References Cited

U.S. PATENT DOCUMENTS

| | | | | |
|---|---|---|---|---|
| 11,848,631 | B2 * | 12/2023 | Yoon .................... | H02K 11/215 |
| 2019/0386547 | A1 * | 12/2019 | Im ......................... | H02K 11/33 |
| 2020/0180564 | A1 * | 6/2020 | Herrada ................. | B60S 1/3479 |
| 2020/0195098 | A1 * | 6/2020 | Shimakawa ........... | H02K 9/227 |
| 2020/0220434 | A1 * | 7/2020 | Kimura .................... | G01D 5/14 |
| 2020/0227992 | A1 * | 7/2020 | Cho ........................ | F16H 3/091 |
| 2020/0366162 | A1 * | 11/2020 | Yoshinaga ........... | G01R 33/072 |
| 2020/0366169 | A1 * | 11/2020 | Sugiura ................ | H02K 11/215 |
| 2021/0288561 | A1 * | 9/2021 | Kato ...................... | H02K 21/16 |
| 2021/0359633 | A1 * | 11/2021 | Kato ....................... | F04D 25/06 |
| 2022/0255487 | A1 * | 8/2022 | Wolf ..................... | H02P 27/085 |
| 2023/0118691 | A1 * | 4/2023 | Morimoto ............ | B62D 5/0406 |
| | | | | 310/71 |
| 2023/0261544 | A1 * | 8/2023 | Kim ..................... | H02K 11/215 |
| | | | | 310/83 |

FOREIGN PATENT DOCUMENTS

| | | |
|---|---|---|
| KR | 10-1803733 | 12/2017 |
| KR | 10-1885953 | 8/2018 |

* cited by examiner

*Primary Examiner* — Forrest M Phillips
(74) *Attorney, Agent, or Firm* — Morgan, Lewis & Bockius LLP (57) ABSTRACT

A motor system includes a motor including a motor cover and a shaft of which a first end portion is exposed to an outside of the motor cover, a permanent magnet provided at the exposed first end portion of the shaft, and a rotation angle detector disposed at a periphery of the permanent magnet, and configured to detect a magnetic field change due to rotation of the permanent magnet during rotation of the shaft to detect a rotation angle of the motor.

19 Claims, 6 Drawing Sheets

MOTOR SYSTEM

CROSS REFERENCE TO RELATED APPLICATION

The present application claims priority to Korean Patent Application No. 10-2021-0079275, filed Jun. 18, 2021, the entire contents of which is incorporated herein for all purposes by this reference.

BACKGROUND OF THE PRESENT DISCLOSURE

Field of the Present Disclosure

The present disclosure relates to a motor system, and more particularly, to a motor system including a motor and an inverter provided at an end portion of a shaft of the motor in parallel to the motor.

DESCRIPTION OF RELATED ART

In general, a motor of an eco-friendly vehicle is driven by receiving power through an inverter. The inverter includes a power module having switching elements, a cooler cooling the power module, a control board controlling on/off of the switching elements in the power module, and a capacitor for generating a D.C. voltage in an inverter circuit including the switching elements in the power module.

A conventional system of driving a motor has a structure in which a reducer is provided at a lateral surface of the motor to reduce the rotation speed of a shaft of the motor and the inverter is coupled to an upper portion of the motor.

The conventional motor driving system has a problem in that, when the torque required for the motor is changed and the size of the motor increases horizontally, an installation position and a connection structure of the inverter at the upper portion of the motor are changed.

The conventional motor driving system has a problem in that the inverter is projected toward the upper portion of the motor thus blocked the upper space of the motor from being utilized.

The conventional motor driving system has a problem in that a coupling direction of the reducer disposed in parallel to a motor shaft direction and a coupling direction of the inverter disposed at the upper portion of the motor are different from each other. Therefore, directions of fastening bolts, etc. during assembly may be different from each other, whereby workability deteriorates.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor system that includes a motor and an inverter provided in parallel to the motor in a direction of a shaft of the motor.

In various aspects of the present disclosure, there is provided a motor system, the motor system including: a motor including a motor cover and a shaft of which a first end portion may be exposed to an outside of the motor cover; a permanent magnet provided at the exposed first end portion of the shaft; and a rotation angle detector disposed at a periphery of the permanent magnet, and configured to detect a magnetic field change due to rotation of the permanent magnet during rotation of the shaft to detect a rotation angle of the motor.

The motor system may further include an inverter including a power module configured to generate driving power driving the motor, the inverter being coupled to the motor at a side where the first end portion of the shaft is exposed.

The inverter may include a capacitor configured to provide D.C. power to the power module, the capacitor having a through hole at a center portion thereof.

The first end portion of the shaft externally exposed of the motor cover may be inserted into the through hole formed in the capacitor.

A cavity may be formed in the first end portion of the shaft externally exposed of the motor cover, and the permanent magnet may be disposed in an area of an internal circumferential surface of the cavity.

The inverter may further include: a control board on which a circuit which may be configured to control a switching element included in the power module may be realized; and a hollow structure passing through the through hole of the capacitor, and disposed between the control board and the cavity of the shaft, and including a hollow portion, and the rotation angle detector may be disposed in an area of the hollow portion of the hollow structure at a location inside the cavity of the shaft.

The motor system may further include a temperature detector disposed in the area of the hollow portion of the hollow structure at the location inside the cavity.

A signal line, through which a signal detected by the rotation angle detector may be transmitted, may be disposed in the hollow portion of the hollow structure, and a first end portion of the signal line may be connected to the control board.

The inverter may further include a cooler with which the power module may be disposed in contact.

The cooler may have a hollow portion at a portion to which the first end portion of the shaft may extend in a disposed direction of the shaft, and the power module may be disposed around the hollow portion of the cooler.

The inverter may further include: a power module bus bar configured to transmit motor driving power output from the power module, and the power module bus bar may extend from the power module to an upper portion of the capacitor.

The power module bus bar may be coupled, at the upper portion of the capacitor, to a motor bus bar connected to an input terminal receiving each phase driving power of the motor.

The motor bus bar may be exposed to an outside of the motor in a disposed direction of the shaft while passing through a through hole formed in the motor cover.

The inverter may further include an inverter cover attached to a surface of the motor and configured to seal elements forming the inverter.

A sealing gasket may be provided in an area where the motor cover and the capacitor may be in contact with each other.

A projection may be formed on an external circumferential surface of the hollow structure of the inverter to restrain a location of the hollow structure by being caught to a rim portion of the through hole of the capacitor, and a sealing gasket may be provided between the through hole of the capacitor and the projection.

The motor system may further include a reducer coupled to the motor in a direction opposite to a side where the inverter may be disposed and in parallel to the inverter and the motor, and configured to change and output a rotation speed of the shaft.

According to the motor system, the motor system can maintain the initial connection structure even when the size of the motor increases in the horizontal direction, so a design change is unnecessary. Therefore, according to the motor system, it is possible to reduce the time and manpower required for the design. The above advantage may be exerted greater in a motor system that adopts a plurality of inverters and thus requires a large number of the power modules.

Furthermore, the motor system can secure the space in the upper portion of the motor, whereby a space in which other various additional components may be provided is secured.

According to an exemplary embodiment of the present disclosure, the motor system has the structure, in which the resolver inserted into the motor and the separate type temperature detector are removed and the hollow structure including the detectors connected to the control board is disposed inside the motor shaft to allow the detectors to provide the detected information to the control board. Therefore, it is possible to solve the contact defect due to the connection of a connector, achieving cost reduction and quality improvement.

Furthermore, the reducer, the motor, and the inverter of the motor system may be assembled to each other in one direction thereof. Accordingly, the assembly work efficiency of the motor system may be improved. When the inverter is located on the upper portion of the motor as generally, a separate bus bar for connecting the bus bar for the power module of the inverter to output the driving power to the three-phase bus bar of the motor may be added in the motor system. However, the motor system according to the various embodiments of the present disclosure may be configured so that the bus bar of the power module in the inverter may be directly connected to the three-phase bus bar of the motor in the inverter. Therefore, the connection structure of the bus bar may be simplified and connection length between the bus bars may be reduced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, predetermined dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, a motor system according to various embodiments will be described in detail with reference to accompanying drawings.

Figure 1:
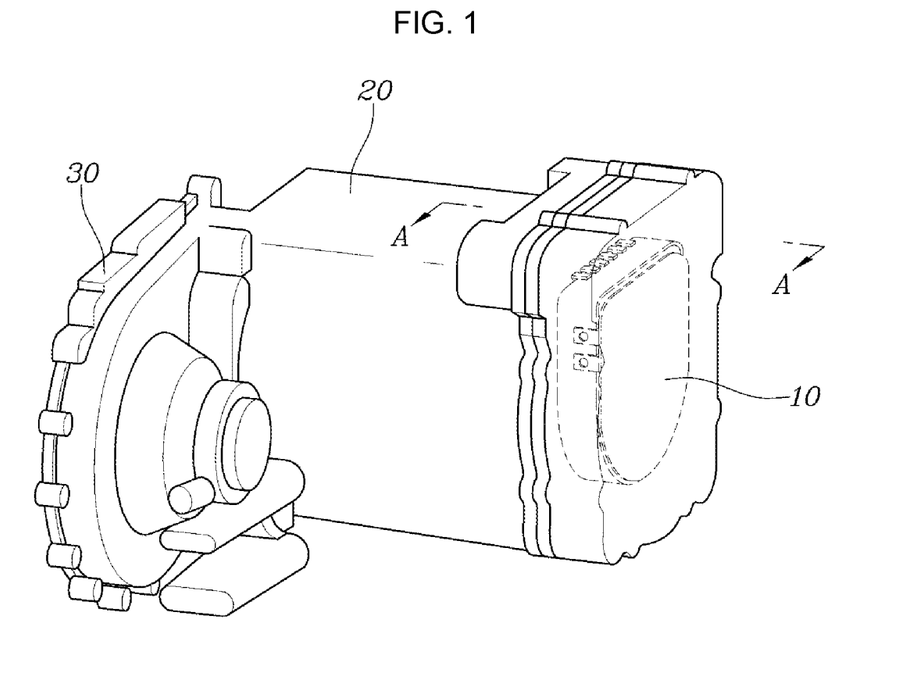
FIG. 1 is a perspective view showing an external appearance of a motor system according to various exemplary embodiments of the present disclosure.
Figure 2:
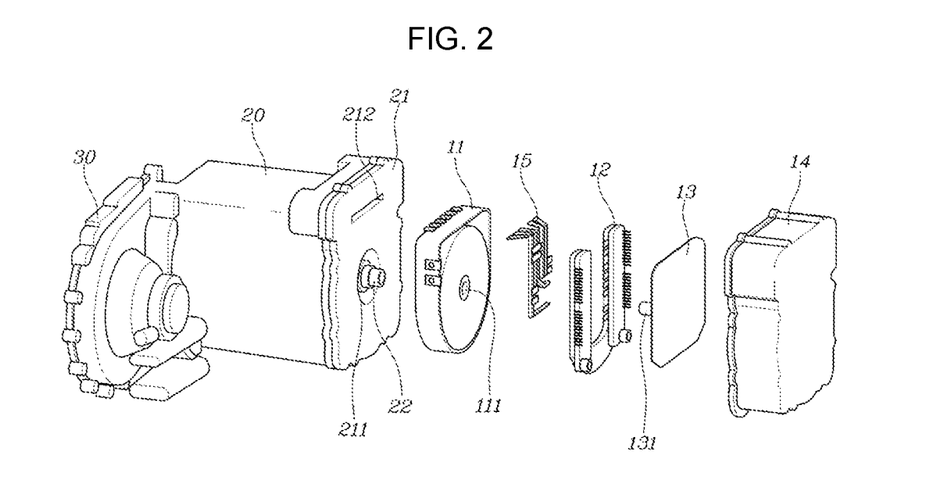
FIG. 2 is an exploded perspective view showing the motor system according to the exemplary embodiment of the present disclosure shown in FIG. 1.
Figure 3:
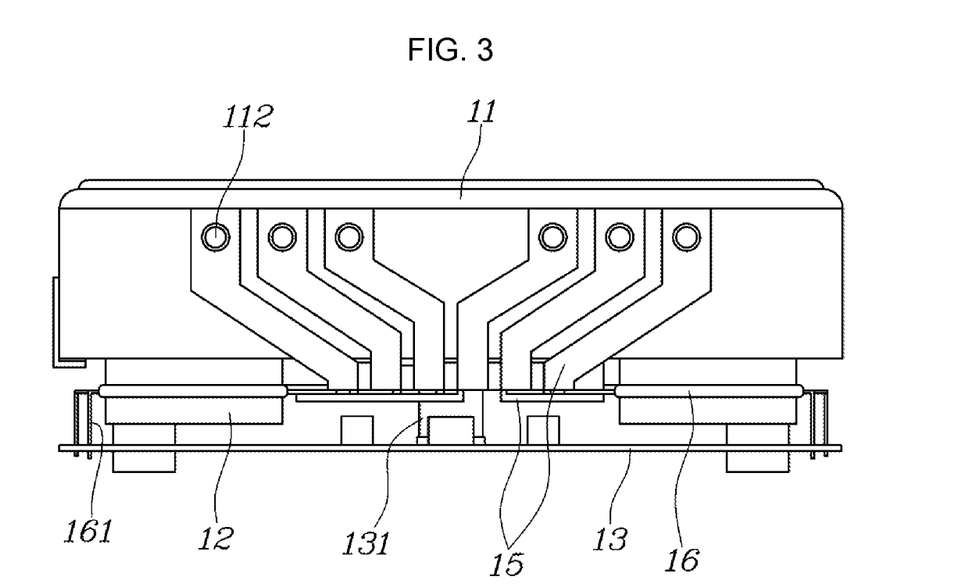
FIG. 3 is a plan view showing an inverter without an inverter cover portion of the motor system according to the exemplary embodiment of the present disclosure shown in FIG. 1.
Figure 4:
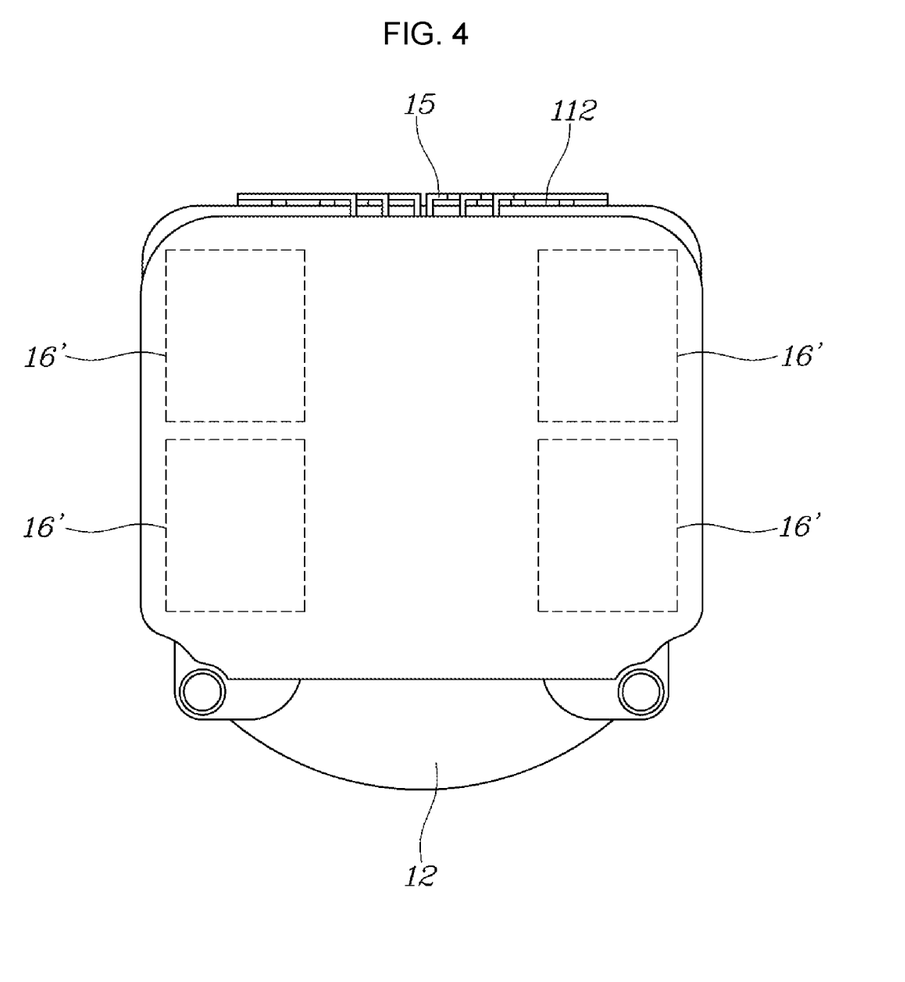
FIG. 4 is a front view showing the inverter without the inverter cover portion of the motor system according to the exemplary embodiment of the present disclosure shown in FIG. 1.
Figure 5:
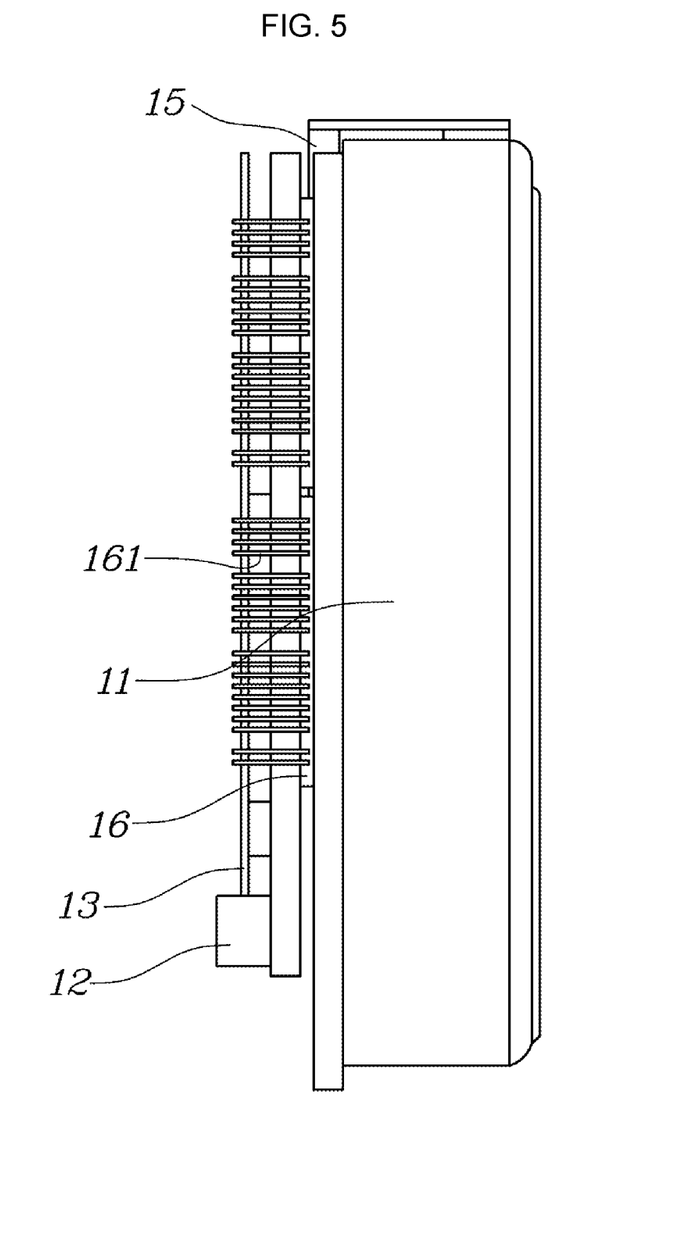
FIG. 5 is a side view showing the inverter without the inverter cover portion the motor system according to the exemplary embodiment of the present disclosure shown in FIG. 1.

FIG. 1 is a perspective view showing an external appearance of a motor system according to various exemplary embodiments of the present disclosure. FIG. 2 is an exploded perspective view showing the motor system according to the exemplary embodiment of the present disclosure shown in FIG. 1. FIG. 3 is a plan view showing an inverter without an inverter cover portion of the motor system according to the exemplary embodiment of the present disclosure shown in FIG. 1. FIG. 4 is a front view showing the inverter without the inverter cover portion of the motor system according to the exemplary embodiment of the present disclosure shown in FIG. 1. FIG. 5 is a side view showing the inverter without the inverter cover portion the motor system according to the exemplary embodiment of the present disclosure shown in FIG. 1.

Referring to FIG. 1, FIG. 2, FIG. 3, FIG. 4, and FIG. 5, the motor system according to the exemplary embodiment of the present disclosure may include a motor 20 and an inverter 10 coupled to a first lateral portion of the motor 20. In the exemplary embodiment of the present disclosure, the motor system may include a reducer 30. The reducer 30 is coupled to the motor 20 in a direction opposite to the side where the inverter 10 is disposed to be in parallel to the inverter 10 and the motor 20, and changes and outputs rotation speed of a shaft to the outside of the motor system.

The motor 20 may include a motor cover 21 and a shaft 22 of which a first end portion is externally exposed of the motor cover 21.

In the motor system according to the exemplary embodiment of the present disclosure, as the motor 20, various types of motors known in the art may be adopted, so detailed illustration and description of detailed configuration of the motor 20 will be omitted. The motor 20 applied to various embodiments of the present disclosure includes a cover 21 provided at the side of the inverter 10. The motor 20 is structurally characterized so that the first end portion of the shaft 22 of the motor 20 is externally exposed of the cover 21.

The inverter 10 may include: a capacitor 11 attached to the motor cover 21 at the first lateral portion of the motor 20 and a hollow portion into which the first end portion of the shaft 22 of the motor 20 is inserted; a power module including a switching element and a cooler 12 provided for cooling the power module; a control board 13 connected to a hollow structure 131 inserted into a cavity formed in the shaft 22 of the motor 20; and an inverter cover 14 joined to the motor cover 21 and sealing the capacitor 11, the cooler 12, and the control board 13. In FIG. 2, reference number '15' is a bus bar 15 transmitting each phase power output from the power module.

The capacitor 11 may have a donut shape in which the through hole 111 is formed by penetrating from a front surface to a rear surface of the capacitor 11. The capacitor 11 may have a structure including a cover and a capacitor provided in the cover. A bus bar coupling portion 112 may be provided on an upper surface of the cover for forming electrical connection to each phase of the motor. The bus bar coupling portion 112 is a portion where a motor bus bar and the bus bar 15 are coupled to each other through a through hole 212 formed in the cover 21 of the motor 20. The motor bus bar is connected to a driving power input terminal of each phase of the motor and the bus bar 15 is a portion to which driving power output from a power module 16 to be described below is transmitted.

The shaft 22 of the motor 20 externally exposed of the cover 21 may be inserted into the through hole 111 at the center portion of the capacitor 11 formed on an area corresponding to the motor shaft 22 via a through hole 211 formed in the cover 21 of the motor 20.

The cooler 12 cooling the power module 16 may be disposed at another surface of the capacitor 11 opposite to the motor 20 in a planar contact structure with the capacitor 11. The cooler 12 is an element for cooling the power module 16 and may have the structure with a hollow portion in which the hollow structure 131 may be disposed. In the exemplary embodiment shown in FIG. 1, FIG. 2, FIG. 3, FIG. 4, and FIG. 5, the cooler 12 may have a 'U'-shaped structure, and power modules 16 including the switching element forming the inverter may be disposed on areas 16' opposite to each other, on the basis of a line extending from the shaft 22 on which the hollow structure 131 is disposed.

The cooler 12 may be formed so that tubes through which coolant flows have a bi-level structure at the areas 16' on which the power modules 16 are disposed. The power modules 16 may be disposed between the tubes of the bi-level structure and thus be cooled at opposite lateral surfaces thereof. As the cooler 12 may be in planar-contact with the capacitor 11, the cooler 12 may cool the capacitor 11.

The bus bar 15 transmitting the motor driving power output from the power module 16 to the motor 20 may be disposed between the areas 16' of the cooler 12 on which the power modules 16 are disposed. A first end portion of the bus bar 15 is connected to a motor driving power output terminal of the power module. A second end portion of the bus bar 15 may be coupled to the motor bus bar connected to the input terminal of each phase of the motor 20 at the bus bar coupling portion 112 located on the upper portion of the capacitor 11, as described above.

The bus bar coupling portion 112 may have a form of coupling the motor bus bar to the bus bar 15 in the inverter by bolting or a form in which a pre-arranged connector provides electrical connection between the motor bus bar and the bus bar in the inverter.

The control board 13 may be provided on one surface of the cooler 12 opposite to the side of the capacitor 11. The control board 13 realizes a control circuit for controlling the power module 16. The control board 13 may include a circuit board and various integrated circuits (ICs) for generating control signals and active passive electrical and electronic elements for controlling the power module 16 for driving the motor. Therefore, a conductive pattern formed on the control board 13 may be electrically connected to a signal lead 161 of the power module.

The control board 13 realizes a circuit that controls speed or torque of the motor or performs a control for preventing motor overheating. Therefore, the control board 13 may receive information obtained by detecting a rotor position and the temperature of the motor.

In various embodiments of the present disclosure, the motor system does not have a detector for detecting the motor rotor position and a detector for detecting the motor temperature therein, but utilizes the hollow structure 131 connected to the control board 13 instead. The motor system has a structure in which a rotor position detector and a temperature detector are provided on a first end portion in the hollow structure 131 and a signal connecting line connecting the detectors to the control board is disposed in the hollow portion in the hollow structure 131.

Figure 6:
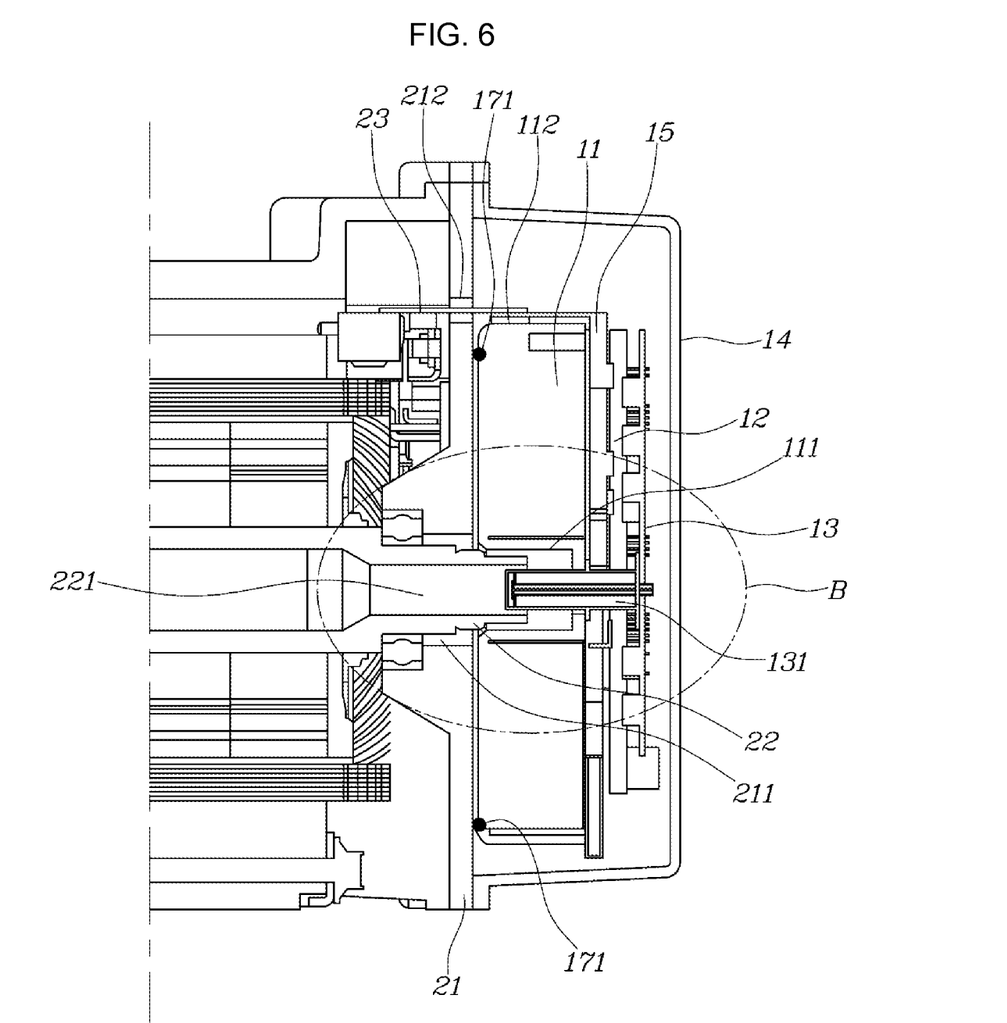
FIG. 6 is a sectional view showing a section taken along line A-A' in FIG. 1.
Figure 7:
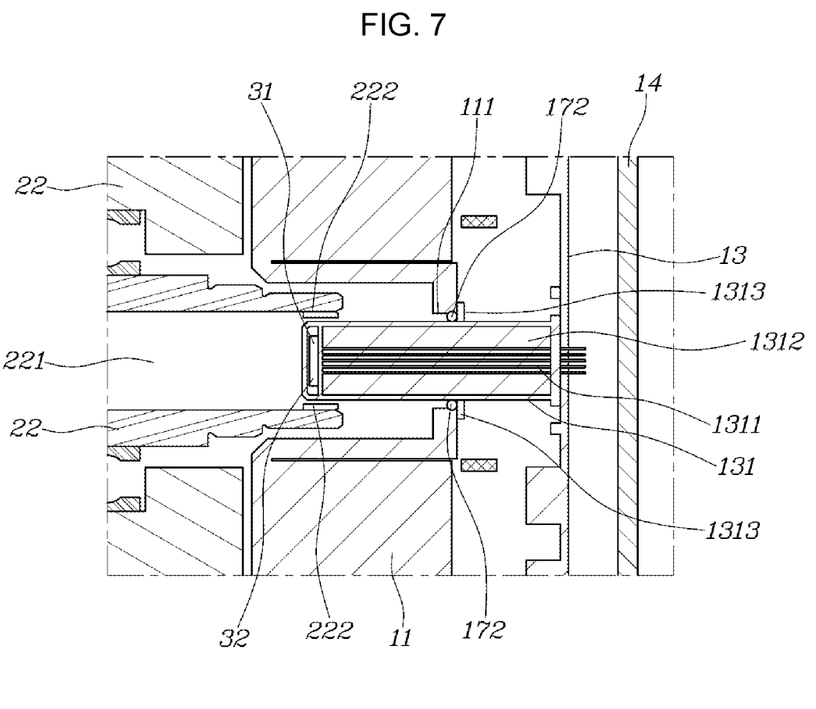
FIG. 7 is a sectional view showing an area larger, which is indicated as area 'B' in FIG. 6.

FIG. 6 is a sectional view showing a section taken along line A-A' in FIG. 1. FIG. 7 is a sectional view showing an area larger, which is indicated as area 'B' in FIG. 6. In FIG. 7, unnecessary components are omitted to illustrate the connection relationship between the motor, the hollow structure, and the control board clearly.

Referring to FIG. 6 and FIG. 7, the first end portion of the shaft 22 of the motor may be projected to the outside of the motor cover 21 via the through hole 211 formed in the motor cover 21. A cavity 221 formed in a direction from the inverter to the motor may be formed on the first end portion of the shaft 22 of the motor. A permanent magnet 222 including a magnetic force may be arranged at a preset location at an internal circumferential surface of an entrance of the cavity 221.

The hollow structure 131 may be disposed in a form that extends from the control board 13 toward the motor shaft 22. The hollow structure 131 may be disposed by passing through the through hole 111 formed in the capacitor 11.

A motor rotation angle detector 31 and a temperature detector 32 may be disposed on one end portion in the hollow structure 131 at the shaft 22 side thereof.

The rotation angle detector 31 is a detector for detecting a rotor position (rotation angle) of the motor. The rotation angle detector 31 may detect the rotation angle by detecting a magnetic field change of the permanent magnet 222, which is disposed at the entrance of the cavity 221 of the shaft 22, during rotation of the shaft 22. Therefore, the length of the hollow structure 131 may be determined so that the rotation angle detector 31 is disposed at a location corresponding to a location of the permanent magnet 222 in the shaft 22.

To restrain the location of the hollow structure 131, a projection 1313 may be formed on an external circumferential surface of the hollow structure 131, so that the hollow structure 131 is locked by an edge portion of the through hole of the capacitor 11.

The temperature detector 32 is an element detecting the temperature of the motor.

To transmit the information related to the rotation angle and temperature detected by the rotation angle detector 31 and the temperature detector 32, a signal line 1311 may be disposed in the hollow portion 1312 of the hollow structure 131. A first end portion of the signal line may be connected to the detectors 31 and 32 that are disposed in the end portion of the hollow structure 131 at the shaft side. A second end portion of the signal line may be connected to the control board 13 while passing through the hollow portion in the hollow structure 131.

For an example, FIG. 6 shows the structure of the motor bus bar 23 which is connected to the driving power input terminal of each phase of the motor as described above, and is exposed to the upper portion of the capacitor 11. The motor bus bar 23 may be externally exposed of the motor 20 via the through hole 212 formed in the cover 21 of the motor 20. The motor bus bar 23 may be mutually coupled to the power module bus bar 15 at the bus bar coupling portion 112 located on the upper portion of the capacitor 11.

In the exemplary embodiment of the present disclosure, a plurality of sealing gaskets may be provided in the motor system for maintaining the airtightness of the motor.

Referring to FIG. 6, an O-ring shaped sealing gasket 171 may be provided in an area where the cover 21 of the motor 20 is in contact with the capacitor 11.

Referring to FIG. 7, to prevent the airtightness of the motor from being removed due to the through hole 111 of the capacitor 11, the O-ring shaped sealing gasket 171 may be provided on the edge portion of the through hole of the capacitor 11. The sealing gasket 171 may be disposed between the projection 1313 formed on the hollow structure 131 and the edge portion of the through hole 111 to allow the airtightness of the motor.

As described above, the motor system according to various embodiments of the present disclosure is disposed in horizontally parallel to the motor. Therefore, the motor system may have various advantages compared to the conventional inverter which is disposed on an upper portion of the motor.

For example, in the conventional inverter disposed on the upper portion of the motor, when the motor design is changed to increase the size of the motor in a horizontal direction as the output required for the motor increases, the connection structure design of the inverter should be changed with the motor design. However, the motor system according to various embodiments of the present disclosure may maintain the initial connection structure even when the size of the motor increases in the horizontal direction, so a design change is unnecessary. Therefore, the above feature of the motor system may reduce the time and manpower required for the design. The above advantage may be exerted greater in a motor system that adopts a plurality of inverters and thus requires a large number of the power modules.

Furthermore, the motor system according to various embodiments of the present disclosure can secure the space in the upper portion of the motor, whereby the space in which other various additional components are provided may be secured.

Furthermore, the motor system according to the various embodiments of the present disclosure has the structure, in which the resolver inserted into the motor and the separate type temperature detector are removed and the hollow structure including the detectors connected to the control board is disposed inside the motor shaft to allow the detectors to provide the detected information to the control board.

Therefore, it is possible to solve the contact defect due to the connection of a connector, achieving cost reduction and quality improvement.

The motor system according to the various embodiments of the present disclosure has a reducer, a motor, and an inverter which may be assembled to each other in one direction. Accordingly, the assembly work efficiency of the motor system may be improved. When the inverter is located on the upper portion of the motor, a separate bus bar for connecting the bus bar for the power module of the inverter to output the driving power to the three-phase bus bar of the motor should be added in the motor system. However, the motor system according to the various embodiments of the present disclosure may be configured so that the bus bar of the power module in the inverter may be directly connected to the three-phase bus bar of the motor in the inverter. Therefore, the connection structure of the bus bar may be simplified and connection length between the bus bars may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor system comprising:
    a motor including a motor cover and a shaft, wherein a first end portion of the shaft is exposed to an outside of the motor cover;
    a permanent magnet provided at the exposed first end portion of the shaft;
    a rotation angle detector disposed at a periphery of the permanent magnet, and configured to detect a magnetic field change due to rotation of the permanent magnet during rotation of the shaft to detect a rotation angle of the motor; and
    an inverter including a power module configured to generate driving power driving the motor, the inverter being coupled to the motor at a side where the first end portion of the shaft is exposed,
    wherein the first end portion of the shaft is extended toward the side so that the exposed first end portion of the shaft is protruded from the motor cover.

2. The motor system of claim 1, wherein the inverter includes a capacitor configured to provide D.C. power to the power module, the capacitor including a through hole at a center portion thereof.

3. The motor system of claim 2, wherein the first end portion of the shaft externally exposed of the motor cover is inserted in the through hole formed in the capacitor.

4. The motor system of claim 3, wherein a cavity is formed in the first end portion of the shaft externally exposed of the motor cover, and the permanent magnet is mounted in an area of an internal circumferential surface of the cavity.

5. The motor system of claim 4, wherein the inverter further includes:
   a control board on which a circuit which is configured to control a switching element included in the power module is realized; and
   a hollow structure passing through the through hole of the capacitor, and disposed between the control board and the cavity of the shaft, and including a hollow portion,
   wherein the rotation angle detector is disposed in an area of the hollow portion of the hollow structure at a location inside the cavity of the shaft.

6. The motor system of claim 5, further including:
   a temperature detector disposed in the area of the hollow portion of the hollow structure at the location inside the cavity.

7. The motor system of claim 6, wherein a signal line, through which a signal detected by the temperature detector is transmitted, is disposed in the hollow portion of the hollow structure, and a first end portion of the signal line is connected to the control board.

8. The motor system of claim 5, wherein a signal line, through which a signal detected by the rotation angle detector is transmitted, is disposed in the hollow portion of the hollow structure, and a first end portion of the signal line is connected to the control board.

9. The motor system of claim 8, wherein the signal line is disposed in the hollow portion of the hollow structure, along an axial direction of the hollow structure.

10. The motor system of claim 1, wherein the inverter further includes:
    a cooler with which the power module is disposed in contact.

11. The motor system of claim 10, wherein the cooler has a hollow portion at a portion to which the first end portion of the shaft extends in a disposed direction of the shaft, and the power module is disposed around the hollow portion of the cooler.

12. The motor system of claim 2, wherein the inverter further includes:
    a power module bus bar configured to transmit motor driving power output from the power module, and the power module bus bar extends from the power module to an upper portion of the capacitor.

13. The motor system of claim 12, wherein the power module bus bar is coupled, at the upper portion of the capacitor, to a motor bus bar connected to an input terminal receiving each phase driving power of the motor.

14. The motor system of claim 13, wherein the motor bus bar is exposed to an outside of the motor in a disposed direction of the shaft while passing through a through hole formed in the motor cover.

15. The motor system of claim 1, wherein the inverter further includes:
    an inverter cover attached to a surface of the motor and configured to seal elements forming the inverter.

16. The motor system of claim 2, wherein a sealing gasket is provided in an area where the motor cover and the capacitor are in contact with each other.

17. The motor system of claim 5, wherein a projection is formed on an external circumferential surface of the hollow structure of the inverter to restrain a location of the hollow structure by being caught to a rim portion of the through hole of the capacitor.

18. The motor system of claim 17, wherein a sealing gasket is provided between the through hole of the capacitor and the projection.

19. The motor system of claim 1, further including:
    a reducer coupled to the motor in a direction opposite to a side where the inverter is disposed and in parallel to the inverter and the motor, and configured to change and output a rotation speed of the shaft.

* * * * *